(12) United States Patent
Sieben

(10) Patent No.: US 8,814,090 B2
(45) Date of Patent: Aug. 26, 2014

(54) CABIN EQUIPMENT COMPONENT CONNECTION SYSTEM AND METHOD FOR MODIFYING PASSENGER CABIN CONFIGURATION

(75) Inventor: Martin Sieben, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/433,046

(22) Filed: Mar. 28, 2012

(65) Prior Publication Data

US 2012/0234974 A1 Sep. 20, 2012

Related U.S. Application Data

(60) Provisional application No. 61/246,172, filed on Sep. 28, 2009.

(30) Foreign Application Priority Data

Sep. 28, 2009 (DE) .......................... 10 2009 043 314

(51) Int. Cl.
*B64D 13/00* (2006.01)

(52) U.S. Cl.
USPC ..................................... 244/118.6; 244/118.5

(58) Field of Classification Search
USPC .................... 244/117 R, 118.1, 118.5, 118.6
See application file for complete search history.

(56) References Cited

U.S. PATENT DOCUMENTS 4,774,514 A * 9/1988 Hildebrandt et al. ......... 340/971
5,083,727 A 1/1992 Pompei et al.
2005/0061914 A1 * 3/2005 Bishop et al. .............. 244/118.5
2005/0246057 A1 11/2005 Olin et al.
2008/0080197 A1 4/2008 Heine et al.
2008/0116686 A1 5/2008 Gonnsen et al.
2008/0277527 A1 11/2008 Fokken et al.
2012/0012707 A1 1/2012 Schliwa et al.

FOREIGN PATENT DOCUMENTS

| DE | 10 2005 019 280 A1 | 11/2005 |
| DE | 10 2005 007 058 | 8/2006 |
| DE | 10 2005 054 890 | 5/2007 |
| DE | 20 2006 014 933 | 3/2008 |

(Continued)

OTHER PUBLICATIONS

English language machine translation of WO 2010/108775 A2, Sep. 30, 2010.

(Continued)

*Primary Examiner* — Timothy D Collins
*Assistant Examiner* — Nicholas McFall
(74) *Attorney, Agent, or Firm* — Krieg DeVault LLP

(57) ABSTRACT

A cabin equipment component connection system for an aircraft comprises a plurality of connecting elements, which are adapted to be connected to a cabin equipment component in order to connect the cabin equipment component to a higher-level system of the aircraft. In at least one zone of the cabin equipment component connection system, a number and an arrangement of the connecting elements in the cabin of the aircraft are selected such that cabin equipment components that are provided in a first number and/or a first arrangement in the cabin of the aircraft are connectable to the connecting elements of the cabin equipment component connection system, and that cabin equipment components that are provided in a second number and/or a second arrangement in the cabin of the aircraft are connectable to the connecting elements of the cabin equipment component connection system.

11 Claims, 3 Drawing Sheets

(56) References Cited

FOREIGN PATENT DOCUMENTS

Figure 1:
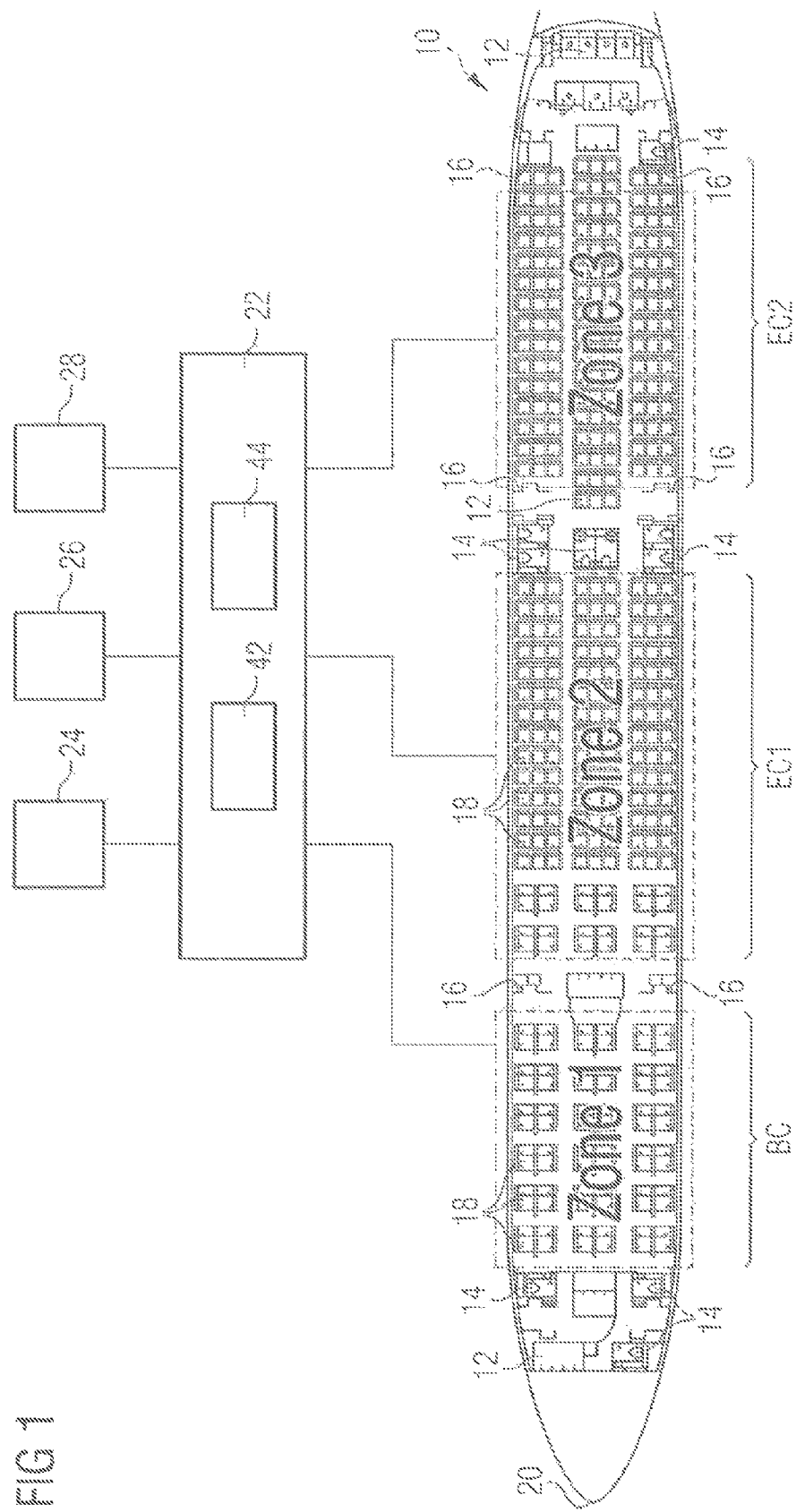

| DE | 10 2009 014 599 | 9/2010 |
|---|---|---|
| EP | 1 803 645 A1 | 7/2007 |
| WO | WO 2010/108775 A2 | 9/2010 |

OTHER PUBLICATIONS

International Search Report and Written Opinion, Apr. 4, 2011, PCT/US2010/005352.

* cited by examiner

CABIN EQUIPMENT COMPONENT CONNECTION SYSTEM AND METHOD FOR MODIFYING PASSENGER CABIN CONFIGURATION

The present application is a continuation patent application of PCT/EP2010/005352, filed Aug. 31, 2010, which claims the benefit of U.S. Provisional Application No. 61/246,172, filed Sep. 28, 2009 and claims priority to German Patent Application No. 10 2009 043 314.7, filed Sep. 28, 2009, each of which is incorporated herein by reference.

The invention relates to a cabin equipment component connection system for an aircraft. The invention further relates to a method of modifying a passenger cabin configuration that uses such a cabin equipment component connection system.

With regard to the operation of modern passenger aircraft, efforts to achieve optimum capacity utilization of the aircraft are gaining increasing importance. Optimizing the aircraft capacity utilization is however often only possible if the aircraft passenger cabin is to a certain extent capable of flexible reconfiguration. In this connection DE 10 2005 007 058 A1 and DE 10 2005 054 890 A1 for example respectively describe a system of line connections and a fastening system that enable built-in units provided in an aircraft passenger cabin, such as for example galleys or toilets, to be disposed at different positions in the aircraft passenger cabin.

For an airline it may make economic sense to operate a passenger aircraft at certain times, for example holiday periods, with a higher number of economy class seats and at other times, for example non-holiday periods, with a higher number of business class seats. It may further be desirable for an airline to vary the total number of seats in the aircraft passenger cabin, for example in dependence upon capacity utilization or flight routes. Optimizing the aircraft capacity utilization therefore entails not only positioning structural units provided in an aircraft passenger cabin as flexibly as possible in the aircraft passenger cabin but also as flexible as possible a division of the aircraft passenger cabin into a business class region and an economy class region and as flexible as possible an adaptation of the distances between seat rows arranged successively in the aircraft passenger cabin.

At present, passenger aircraft are delivered by the manufacturer with a defined passenger cabin configuration, i.e. with a defined division of the aircraft passenger cabin into a business class region and an economy class region, and with a defined number of seat rows. The arrangement of cabin elements, such as for example partitions or structural units, but also the layout of cabin equipment components, such as for example cabling, individual air feed devices, personal service units, display elements, oxygen supply systems, lighting elements or electronic entertainment components, are adapted to this defined passenger cabin configuration. For the defined passenger cabin configuration the manufacturer provides documentation. The manufacturer's passenger cabin configuration is moreover the subject matter of a certificate.

A reconfiguration of the passenger cabin configuration defined by the manufacturer therefore requires not just a restructuring of the seat arrangement in the passenger cabin. Rather, an adaptation of the arrangement of cabin elements and an adaptation of the cabin equipment component layout to the altered passenger cabin configuration is also necessary. For example, varying the distances between successively arranged seat rows inevitably entails adapting the arrangement of cabin equipment components associated with the seat rows, such as for example cables, individual air feed devices, personal service units, display elements, oxygen supply systems, lighting elements, electronic entertainment components etc.

In particular, safety-relevant layout modifications have to be subjected to extensive tests before the aircraft is returned to operation after the cabin configuration. Finally, depending on the extent of the reconfiguration measures that are carried out, certification of the modified passenger cabin configuration by the authorities, but at least by the manufacturer, is required. The reconfiguring of a manufacturer's defined passenger cabin configuration of a passenger aircraft is consequently very time-consuming and costly. Measures to optimize the aircraft capacity utilization that call for a flexible design of the aircraft passenger cabin are therefore currently often impossible to realize or can be realized only to a very limited extent.

The underlying object of the present invention is to provide a cabin equipment component connection system for an aircraft that enables simple and time-saving modification of a passenger cabin configuration. A further underlying object of the invention is to indicate a method of modifying a passenger cabin configuration that uses such a cabin equipment component connection system.

This object is achieved by a cabin equipment component connection system for an aircraft having the features of claim 1 and by a method of modifying a passenger cabin configuration having the features of claim 9.

The cabin equipment component connection system according to the invention comprises a plurality of connecting elements, which are adapted to be connected to a cabin equipment component in order to connect the cabin equipment component to a higher-level system of the aircraft. A cabin equipment component that is connectable by means of a connecting element of the cabin equipment component connection system according to the invention to a higher-level system of the aircraft may be a cabin element, such as for example a partition or a structural unit, such as for example an aircraft galley, a toilet or the like. Alternatively, the cabin equipment component may however be part of the aircraft cabling, part of the aircraft air conditioning system, such as for example an individual air feed device, a personal service unit, a display element, part of an emergency oxygen supply system, a lighting element, an electronic entertainment component or the like.

The higher-level aircraft system may be a cable system, such as for example a central or decentralized cable system of the aircraft, that is used to supply the cabin equipment component with electrical energy and/or to transmit signals. Alternatively the system may be an air conditioning system, a water-conducting system or any other supply system of the aircraft. The design of the connecting element is adapted to the design of the cabin equipment component and the design of the higher-level aircraft system. The connecting element may accordingly be an electric or electronic connecting element or a connecting element that is suitable for the connection of air- or water-conducting lines.

The number and/or the arrangement of the cabin equipment components in the aircraft passenger cabin are adapted to the higher-level configuration of the aircraft passenger cabin. In other words, given a configuration of the cabin of the aircraft with a predetermined number of passengers or with rows of seats that are arranged at a predetermined distance from one another, a number of cabin equipment components that is adapted to the predetermined passenger number or the predetermined seat row distance is provided in the aircraft passenger cabin at positions that are adapted to the predetermined passenger number or the predetermined seat row distance. For example, the number and the position of partitions or structural units provided in the aircraft passenger cabin may be varied in dependence upon the predetermined passenger number or the predetermined seat row distance. In a similar fashion, the number and the arrangement of cabin equipment components, such as cabling, air feed devices, personal service units, display elements, components of the emergency oxygen supply system, lighting elements or electronic entertainment components, may be adapted to the predetermined passenger number or the predetermined seat row distance in the aircraft passenger cabin.

The cabin equipment component connection system according to the invention may be subdivided into a plurality of zones that may be assigned to predetermined regions of the aircraft passenger cabin. Alternatively, however, the cabin equipment component connection system may comprise only one zone that is assigned to one region of the aircraft passenger cabin or to the entire aircraft passenger cabin.

In at least one zone of the cabin equipment component connection system a number and an arrangement of the connecting elements in the cabin of the aircraft are selected such that, given a configuration of the cabin of the aircraft with a predetermined first number of passengers or with rows of seats that are arranged at a predetermined first distance from one another, cabin equipment components provided in a first number and/or first arrangement in the cabin of the aircraft that is adapted to the predetermined first passenger number or the predetermined first seat row distance are connectable to the connecting elements of the cabin equipment component connection system. Furthermore, the number and the arrangement of the connecting elements in the cabin of the aircraft in the at least one zone of the cabin equipment component connection system are selected such that, given a configuration of the cabin of the aircraft with a predetermined second number of passengers or with rows of seats that are arranged at a predetermined second distance from one another, cabin equipment components provided in a second number and/or second arrangement in the cabin of the aircraft that is adapted to the predetermined second passenger number or the predetermined second seat row distance are connectable to the connecting elements of the cabin equipment component connection system, without a modification of the number and the arrangement of the connecting elements in the cabin of the aircraft being required for this purpose.

In other words, the cabin equipment component connection system according to the invention is so designed, i.e. the number and the arrangement of the connecting elements of the cabin equipment component connection system in the aircraft passenger cabin are selected such that in at least two different cabin configurations, which are defined by a predetermined passenger number or a predetermined seat row distance in the aircraft passenger cabin, all of the cabin equipment components provided in these cabin configurations may be connected to corresponding connecting elements of the cabin equipment component connection system, without a reconfiguration of the cabin equipment component connection system being required for this purpose.

With the aid of the cabin equipment component connection system according to the invention the aircraft passenger cabin may therefore be reconfigured in a particularly simple and time-saving manner between at least two configurations. Reconfiguring- and idle times of the aircraft may therefore be reduced from a few days to a few hours. As, moreover, in the case of a reconfiguration of the aircraft passenger cabin using the cabin equipment component connection system according to the invention it is possible to dispense with the installation of additional connecting elements in the aircraft passenger cabin, the risk of error during the reconfiguration of the cabin is lowered, thereby making it possible to predict with greater reliability the idle times of the aircraft that are needed for the cabin reconfiguration. Furthermore, by dispensing with the installation of additional connecting elements when reconfiguring the cabin the tests required before the aircraft is returned to service after the cabin reconfiguration may be considerably simplified. Finally it is possible to dispense with stocking additional connecting elements that are provided for installation in the event of a cabin reconfiguration.

As already mentioned, a cabin reconfiguration may comprise merely a repositioning of cabin equipment components in the aircraft passenger cabin. In such a case, the connecting elements of the cabin equipment component connection system have to be positioned in such a way in the aircraft passenger cabin that they enable a proper connection of the cabin equipment components disposed at various positions in the aircraft passenger cabin to the higher-level aircraft system. For example, the cabin equipment component connection system may comprise a first connecting element, which in a first cabin configuration is connected to a cabin equipment component disposed in a first position in the cabin, and a second connecting element, which in a second cabin configuration is connected to the cabin equipment component that in the second cabin configuration is disposed in a second position in the cabin.

Alternatively or in addition thereto, a cabin reconfiguration may however entail a variation of the number of cabin equipment components that are to be connected by means of the connecting elements of the cabin equipment component connection system to a higher-level aircraft system. In such a case the cabin equipment component connection system has to be provided with a number of connecting elements that is adapted to the higher number of cabin equipment components that are to be connected in two different cabin configurations to a higher-level aircraft system. In principle, the equipping of the cabin equipment component connection system according to the invention with a suitable number of connecting elements to that are disposed at suitable positions in the aircraft passenger cabin may result in a specific excess weight of the system compared to conventional cabin equipment component connection systems. However drawbacks, in particular economic drawbacks, resulting from this excess weight are compensated by the economic advantages of the system according to the invention.

Preferably in at least one zone of the cabin equipment component connection system according to the invention that is assigned to a predetermined region of a cabin of the aircraft a number and an arrangement of the connecting elements in the cabin of the aircraft are selected such that, given a configuration of the cabin of the aircraft with a predetermined maximum number of passengers or with rows of seats that are arranged at a predetermined minimum distance from one another, cabin equipment components provided in the cabin of the aircraft in a corresponding number, i.e. a number adapted to the predetermined maximum passenger number or the predetermined minimum seat row distance, or in a corresponding arrangement, i.e. an arrangement adapted to the predetermined maximum passenger number or the predetermined minimum seat row distance, are connectable to the connecting elements of the cabin equipment component connection system, without a modification of the number and the arrangement of the connecting elements in the cabin of the aircraft being required for this purpose.

In other words, in the case of the cabin equipment component connection system according to the invention there are sufficient connecting elements available in a corresponding arrangement in the aircraft passenger cabin that a number and arrangement of cabin equipment components provided for a predetermined maximum passenger number or a predetermined minimum seat row distance may be connected by means of the connecting elements to corresponding higher-level aircraft systems. The cabin equipment component connection system is then designed for a maximum capacity utilization of the aircraft passenger cabin.

In a particularly preferred embodiment of the cabin equipment component connection system according to the invention, in at least one zone of the cabin equipment component connection system that is assigned to a predetermined region of a cabin of the aircraft a number and an arrangement of the connecting elements in the cabin of the aircraft are selected such that, given a configuration of the cabin of the aircraft with any predetermined number of passengers or with rows of seats that are arranged at any predetermined distance from one another, cabin equipment components provided in a corresponding number and/or a corresponding arrangement in the cabin of the aircraft are connectable to the connecting elements of the cabin equipment component connection system, without a modification of the number and the arrangement of the connecting elements in the cabin of the aircraft being required for this purpose. Here, by "any predetermined number of passengers" is meant any number of passengers defined for example by the manufacturer, with which a corresponding number and/or a corresponding arrangement of cabin equipment components in the aircraft passenger cabin are associated. In a similar fashion, here by "any predetermined seat row distance" is meant any seat row distance defined for example by the manufacturer, with which a corresponding number and/or a corresponding arrangement of cabin equipment components in the aircraft passenger cabin is associated.

For example, the manufacturer may associate with any passenger number up to the maximum permissible passenger number or with any seat row distance up to the minimum permissible seat row distance a corresponding number and/or arrangement of cabin equipment components in the aircraft passenger cabin. In dependence upon this association the cabin equipment component connection system according to the invention may then be so designed that for all predefined numbers and/or arrangements of cabin equipment components in the aircraft passenger cabin corresponding connecting elements are available for connecting the cabin equipment components to corresponding higher-level aircraft systems. A cabin equipment component connection system so designed enables a particularly flexible reconfiguration of the aircraft passenger cabin. What is more, the outlay for adapting the documentation to the reconfiguration as well as a possibly required re-certification of the reconfiguration may be minimized.

During operation of an aircraft there is the problem that various aircraft systems, such as for example monitoring systems, but also control systems, such as for example the flight control system, in order to prevent error messages or for control purposes should receive information about the configuration state of the aircraft cabin and hence about the configuration state of the cabin equipment component connection system according to the invention. The cabin equipment component connection system according to the invention therefore preferably comprises a control system, which is adapted to provide data that are characteristic of a configuration state of the cabin equipment component connection system. The to control system may be implemented in the form of hardware or software. The control system may further be adapted to communicate the data characteristic of the configuration state of the cabin equipment component connection system to a further monitoring- or control system of the aircraft for further processing.

For example, the control system may be adapted to provide data, which in dependence upon the configuration state of the cabin equipment component connection system indicate whether or not a connecting element of the cabin equipment component connection system is connected to a cabin equipment component. The control system preferably provides data regarding the connection status of all of the connecting elements of the cabin equipment component connection system. The data provided by the control system may be further processed in a further monitoring- or control system of the aircraft.

For example, the data may be made available to a centralized maintenance system, which in order to monitor proper functioning of the cabin equipment components regularly checks whether all of the connecting elements of the cabin equipment component connection system are connected to corresponding cabin equipment components. On the basis of the data provided by the control system of the cabin equipment component connection system the centralized maintenance system can identify and check the connecting elements of the cabin equipment component connection system that in a specific configuration state of the cabin equipment component connection system are connected to a cabin equipment component. Connecting elements that are not connected to a cabin equipment component, on the other hand, may be exempted from the check in order to avoid unjustified error messages of the centralized maintenance system.

During a reconfiguration of the aircraft passenger cabin it is possible, for example as a result of the installation of additional cabin equipment components, the repositioning of cabin equipment components or the deinstallation of cabin equipment components, for the weight of the aircraft to vary and/or the centre of gravity of the aircraft to shift. This has to be taken into consideration by the flight control, i.e. when calculating the relevant flight parameters during take-off and landing and when calculating the relevant flight parameters during cruising of the aircraft at cruising altitude. The cabin equipment component connection system according to the invention therefore preferably comprises a control system, which is adapted to provide data regarding the weight of the cabin equipment component connection system and of the cabin equipment components connected thereto and/or regarding the influence of the weight and the arrangement of the cabin equipment component connection system and the cabin equipment components connected thereto upon the centre of gravity of the aircraft.

The control system may take the form of a hardware- or software-implemented control system. The control system may moreover be formed separately or integrated with the control system that provides data characteristic of the configuration state of the cabin equipment component connection system. The data provided by the control system may be communicated to a further control- or monitoring system of the aircraft.

The data provided by the control system regarding the weight of the cabin equipment component connection system and of the cabin equipment components connected thereto and/or regarding the influence of the weight and the arrangement of the cabin equipment component connection system and of the cabin equipment components connected thereto upon the centre of gravity of the aircraft may be processed in different ways. In a first variant the control system may be adapted to use the data regarding the weight of the cabin equipment component connection system and of the cabin equipment components connected thereto and/or regarding the influence of the weight and the arrangement of the cabin equipment component connection system and of the cabin equipment components connected thereto upon the centre of gravity of the aircraft to update a database, which contains parameter data regarding the weight of the cabin equipment component connection system and of the cabin equipment components connected thereto and/or regarding the influence of the weight and the arrangement of the cabin equipment component connection system and of the cabin equipment components connected thereto upon the centre of gravity of the aircraft. In other words, the data provided by the control system may be used to maintain and update the parameter data stored in the database. The database then contains always actual, "real" data, which other monitoring- or control systems of the aircraft, for example a flight control system, may access. Given use of the data provided by the control system of the cabin equipment component connection system to update a database, a corresponding updating of the technical documentation is preferably also effected.

In addition or alternatively thereto, the control system of the cabin equipment component connection system may also be adapted to use the data regarding the weight of the cabin equipment component connection system and of the cabin equipment components connected thereto to determine a correction factor, which is capable of compensating a difference between a real weight of the cabin equipment component connection system and of the cabin equipment components connected thereto and a parameter value for the weight of the cabin equipment component connection system and of the cabin equipment components connected thereto that is stored in the database. In a similar fashion, the control system may be adapted to use the data regarding the influence of the weight and the arrangement of the cabin equipment component connection system and of the cabin equipment components connected thereto upon the centre of gravity of the aircraft to determine a correction factor, which is capable of compensating a difference between a real influence of the weight and the arrangement of the cabin equipment component connection system and of the cabin equipment components connected thereto upon the centre of gravity of the aircraft and a parameter value for the influence of the weight and the arrangement of the cabin equipment component connection system and of the cabin equipment components connected thereto upon the centre of gravity of the aircraft that is stored in a database.

In other words, the control system of the cabin equipment component connection system may determine a "virtual weight" of the cabin equipment component connection system and of the cabin equipment components connected thereto as well as a "virtual influence" of the weight and the arrangement of the cabin equipment component connection system and of the cabin equipment components connected thereto upon the centre of gravity of the aircraft. These data may then be used, for example in the flight controller, as correction factors for corresponding parameter values stored in a database, so that a variation of the weight of the cabin equipment component connection system and of the cabin equipment components connected thereto as well as a variation of the influence of the weight and the arrangement of the cabin equipment component connection system and of the cabin equipment components connected thereto upon the centre of gravity of the aircraft in the event of a reconfiguration of the aircraft cabin may be properly taken into consideration, without an actual updating of the database and a corresponding updating of the technical documentation being required.

In the method according to the invention of modifying a passenger cabin configuration in an aircraft a cabin equipment component connection system as described above is provided for an aircraft. The method according to the invention may comprise the disconnecting of at least one cabin equipment component from a connecting element of the cabin equipment component connection system. Alternatively or in addition thereto, the method according to the invention may comprise the connecting of at least one cabin equipment component to a connecting element of the cabin equipment component connection system.

In a preferred embodiment of the method according to the invention of modifying a passenger cabin configuration a control system of the cabin equipment component connection system provides data that are characteristic of a configuration state of the cabin equipment component connection system. The control system may provide data, which in dependence upon the configuration state of the cabin equipment component connection system indicate whether a connecting element of the cabin equipment component connection system is connected to a cabin equipment component.

A control system may provide data that are characteristic of the weight of the cabin equipment component connection system and of the cabin equipment components connected thereto and/or the influence of the weight and the arrangement of the cabin equipment component connection system and of the cabin equipment components connected thereto upon the centre of gravity of the aircraft.

The control system may use the data regarding the weight of the cabin equipment component connection system and of the cabin equipment components connected thereto and/or regarding the influence of the weight and the arrangement of the cabin equipment component connection system and of the cabin equipment components connected thereto upon the centre of gravity of the aircraft to update a database, which contains parameter data regarding the weight of the cabin equipment component connection system and of the cabin equipment components connected thereto and/or regarding the influence of the weight and the arrangement of the cabin equipment component connection system and of the cabin equipment components connected thereto upon the centre of gravity of the aircraft.

Alternatively or in addition thereto, the control system may use the data regarding the weight of the cabin equipment component connection system and of the cabin equipment components connected thereto to determine a correction factor, which is capable of compensating a difference between a real weight of the cabin equipment component connection system and of the cabin equipment components connected thereto and a parameter value for the weight of the cabin equipment component connection system and of the cabin equipment components connected thereto that is stored in the database. The control system may moreover use the data regarding the influence of the weight and the arrangement of the cabin equipment component connection system and of the cabin equipment components connected thereto upon the centre of gravity of the aircraft to determine a correction factor, which is capable of compensating a difference between a real influence of the weight and the arrangement of the cabin equipment component connection system and of the cabin equipment components connected thereto upon the centre of gravity of the aircraft and a parameter value for the influence of the weight and the arrangement of the cabin equipment component connection system and of the cabin equipment components connected thereto upon the centre of gravity of the aircraft that is stored in a database.

Figure 2:
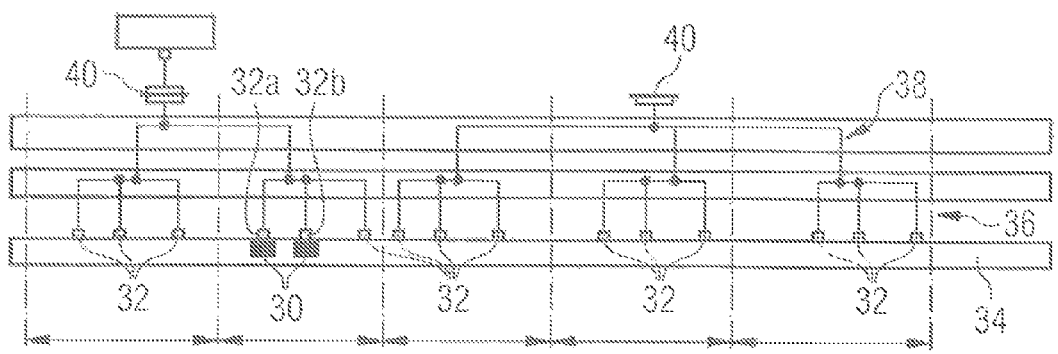
Figure 3:
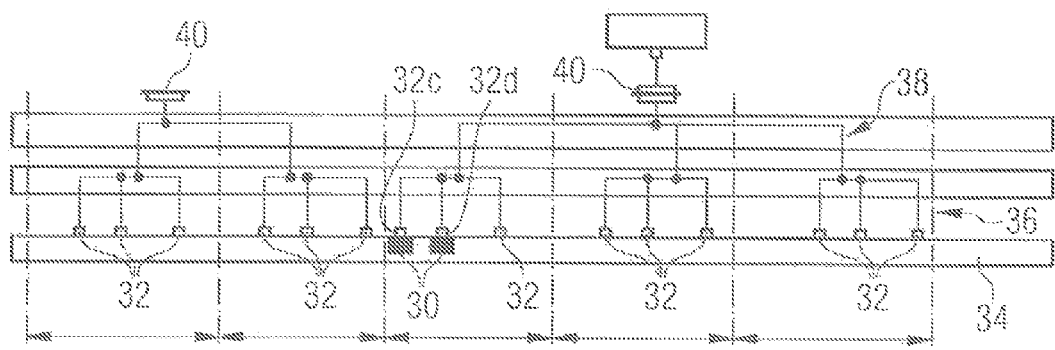
Figure 4:
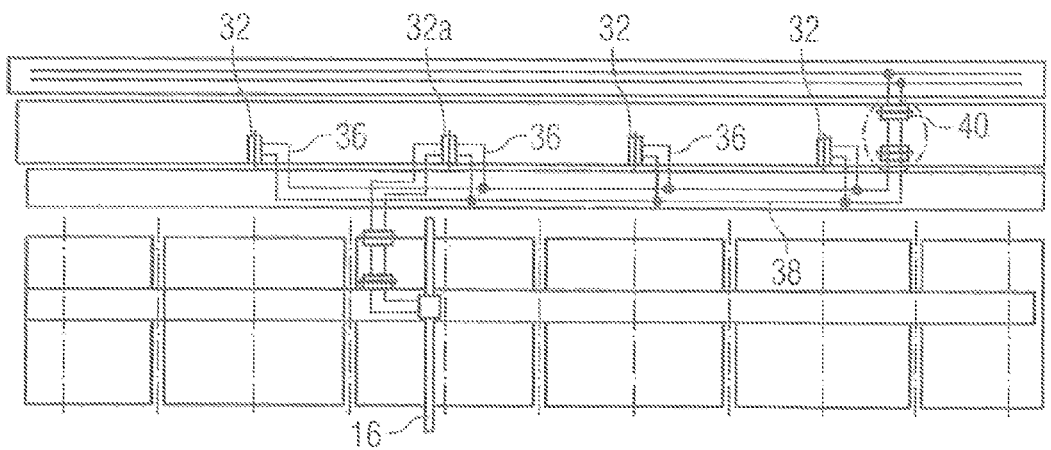
Figure 5:
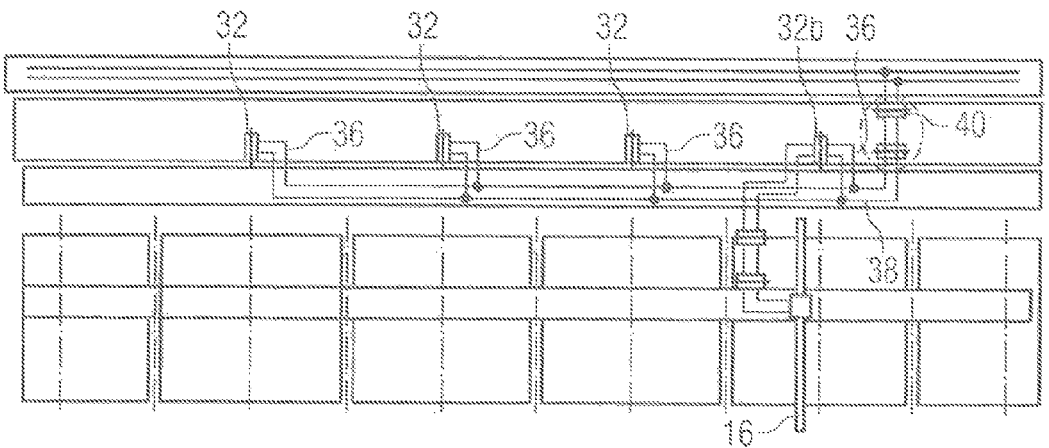

There now follows a detailed description of preferred embodiments of the invention with reference to the accompanying diagrammatic drawings, which show in FIG. 1 an aircraft cabin, which is equipped with a cabin equipment component connection system that is subdivided into three zones, FIG. 2 the cabling layout of a first part of a cabin equipment component connection system in a first passenger cabin configuration, FIG. 3 the cabling layout of the part, represented in FIG. 2, of a cabin equipment component connection system in a second passenger cabin configuration, FIG. 4 the cabling layout of a further part of a cabin equipment component connection system in the first passenger cabin configuration, and FIG. 5 the cabling layout of the part, represented in FIG. 4, of a cabin equipment component connection system in a second passenger cabin configuration.

FIG. 1 shows a diagrammatic view of an aircraft passenger cabin 10. In the aircraft passenger cabin 10 a plurality of structural units, such as for example galleys 12, toilets 14 and partitions 16 are disposed. The aircraft passenger cabin 10 is further equipped with a plurality of seat rows 18. Situated in a front portion of the aircraft passenger cabin 10 facing a nose 20 of the aircraft is a business class area BC, in which successively arranged seat rows 18 are at a greater distance from one another than in two economy class areas EC1, EC2 that are provided in a rear region of the aircraft passenger cabin 10.

The aircraft passenger cabin 10 is further equipped with a plurality of cabin equipment components, such as for example cabling, air feed devices, personal service units, display elements, oxygen supply systems, lighting elements, electronic entertainment components etc. The cabin equipment components are connected by a cabin equipment component connection system 22, which is merely diagrammatically indicated in FIG. 1, to higher-level systems of the aircraft, i.e. for example a central or decentralized cable system 24 of the aircraft, an aircraft air conditioning system 26 and a water-conducting system 28. The cabin equipment component connection system 22 is used also to connect the structural units disposed in the aircraft passenger cabin 10, i.e. the galleys 12, the toilets 14 and the partitions 16, to the higher-level aircraft systems 24, 26, 28. The cabin equipment component connection system 22 is subdivided into three different zones, a front zone 1 facing the aircraft nose 20, a central zone 2 and a rear zone 3.

To enable an optimization of the aircraft capacity utilization, the aircraft passenger cabin 10 may be configured in various ways. For this purpose at least some of the structural units disposed in the aircraft passenger cabin 10, in particular the partitions 16, may be positioned at different locations in the aircraft passenger cabin 10. It is moreover possible to vary the number of seat rows 18 disposed in the aircraft passenger cabin 10. Increasing the number of seat rows 18 results in a reduction of the distance between two successively arranged seat rows, while reducing the number of seat rows 18 results in an increase of the distance between two successively arranged seat rows 18. Finally, the division of the aircraft passenger cabin into the business class area BC and the economy class areas EC1, EC2 is flexible, i.e. if desired, regions of the aircraft passenger cabin 10 that in a first configuration of the aircraft passenger cabin 10 are assigned to the business class area BC may in a second configuration of the aircraft passenger cabin 10 be assigned to one of the economy class areas EC1, EC2 and vice versa.

The reconfiguration options for the aircraft passenger cabin 10 are linked to predetermined conditions that are defined either by the authorities or by the manufacturer. For example, a maximum passenger number and hence a maximum number of seat rows 18 in the aircraft passenger cabin 10 must not be exceeded or the distance between successively arranged seat rows 18 must not fall below a specified minimum distance. The various permissible configuration options for the passenger cabin 10 may therefore be for example already predefined by the manufacturer. It is however also conceivable to permit a flexible configuration of the aircraft passenger cabin within acceptability conditions that are for example predefined by the manufacturer.

FIGS. 2 and 3 show a part of the cabin equipment component connection system 22 that is used to connect two heating devices 30 disposed in the aircraft passenger cabin 10 to the higher-level cable system 24 of the aircraft in order to supply the heating devices 30 with electrical energy and control signals for controlling the operation of the heating devices 30. For this purpose the part of the cabin equipment component connection system 22 comprises a plurality of connecting elements 32.

The connecting elements 32 are arranged distributed along an air-conducting line 34 that extends through the aircraft passenger cabin 10 along a longitudinal axis of the aircraft passenger cabin 10. The individual connecting elements 32 are connected by corresponding connection lines 36, 38 to higher-level connection points 40.

As is evident from a comparison of FIGS. 2 and 3, the heating devices 30 in a first configuration of the aircraft passenger cabin 10, in which a configuration of the cabin 10 with a predetermined first number of passengers and with seat rows 18 arranged at a predetermined first distance from one another is provided, are disposed in such a way in the aircraft passenger cabin 10, i.e. in the air-conducting line 34, that they may be connected by connecting elements 32a, 32b to the higher-level cable system 24 of the aircraft. In a second configuration of the aircraft passenger cabin 10, in which a configuration of the cabin 10 with a predetermined second number of passengers and with seat rows 18 arranged at a predetermined second distance from one another is provided, the heating devices 30 are on the other hand disposed at a different location in the aircraft passenger cabin 10, i.e. at a different location in the air-conducting line 34. The heating devices 30 may then be connected by connecting elements 32c, 32d to the higher-level cable system 24 of the aircraft. The number and the arrangement of the connecting elements 32 are therefore selected such that in any configuration of the aircraft passenger cabin 10 connecting elements 32 that are suitable for the configuration-dependently arranged heating devices 30 are available, without a retrofitting of the cabin equipment component connection system 22 or a modification of the cabling of the cabin equipment component connection system 22 being required for this purpose.

In the embodiment shown in FIGS. 2 and 3 the modification of the passenger cabin configuration influences merely the arrangement of the heating devices 30 in the aircraft passenger cabin 10 and/or in the air-conducting line 34. A modification of the passenger cabin configuration may however also entail a variation of the number of heating devices 30. For example, it is conceivable that a higher number of heating devices becomes necessary if the passenger number in the aircraft cabin increases beyond a specific threshold value and/or the distance between successively arranged seat rows 18 is reduced beyond a specific threshold value. In a similar fashion it is conceivable that the number of heating devices 30 may be reduced if the predetermined passenger number in the cabin 10 drops below a specific threshold value and/or the distance between seat rows 18 disposed in the cabin 10 rises above a specific threshold value. The number and the arrangement of the connecting elements 32 is however selected such that, given any, optionally predefined configuration of the aircraft passenger cabin 10, i.e. given a configuration of the cabin 10 with any predetermined passenger number and/or seat rows 18 that are arranged at any predetermined distance from one another, sufficient connecting elements 32 are available, which are also disposed in such a way that all of the required heating devices 30 may be connected to the higher-level cable system 24 of the aircraft, without a modification of the number and the arrangement of the connecting elements 32 being required for this purpose. The cabin equipment component connection system 22 is therefore designed also for a configuration of the aircraft passenger cabin 10 with a predetermined maximum number of passengers and/or seat rows 18 that are arranged at a predetermined minimum distance from one another.

FIGS. 4 and 5 show a part of a cabin equipment component connection system 22 that is used to connect a partition 16, which is fastenable at various positions in the aircraft passenger cabin 10, to the higher-level cable system 24 of the aircraft. For this purpose the cabin equipment component connection system 22 is likewise provided with a plurality of connecting elements 32 that are disposed at various positions in the aircraft passenger cabin 10. The arrangement of the connecting elements 32 in the cabin 10 is adapted to the various positions that the partition 16 occupies in any, optionally predefined configuration of the aircraft passenger cabin 10. In other words, the arrangement of the connecting elements 32 in the cabin 10 is selected such that, given a configuration of the cabin 10 with any predetermined passenger number and/or seat rows 18 that are arranged at any predetermined distance from one another, a connecting element 32 that enables a connection of the correspondingly positioned partition 16 to the higher-level cable system 24 of the aircraft is available.

Similarly, in the embodiment shown in FIGS. 4 and 5 a reconfiguration of the aircraft passenger cabin 10 entails merely a variation of the arrangement of the partition 16 in the aircraft passenger cabin 10. It is however self-evident that a reconfiguration of the aircraft passenger cabin 10 may also entail the arrangement of additional partitions 16 or the reduction of the number of partitions 16 provided in the aircraft passenger cabin 10. The cabin equipment component connection system 22 is however likewise designed in such a way that in all conceivable configurations of the passenger cabin 10 a connecting element 32 is available for connecting the partition/partitions 16 to the higher-level cable system 24 of the aircraft.

As may be seen in FIGS. 2 to 5, the cabin equipment component connection system 22 may in dependence upon the configuration state of the aircraft passenger cabin 10 comprise connecting elements 32 that are not connected to a corresponding cabin equipment component, such as for example a heating device 30 or a partition 16. As the connection status of the connecting elements 32 in order to monitor proper functioning of the cabin equipment components is regularly checked by a corresponding monitoring system of the aircraft, for example the centralized maintenance system, connecting elements 32 that are not connected to corresponding cabin equipment components would inevitably generate error messages if the higher-level monitoring system of the aircraft were unable to access data characteristic of a configuration state of the cabin equipment component connection system 22.

For this reason the cabin equipment component connection system 22, as is diagrammatically indicated in FIG. 1, comprises a control system 42 that provides data that are characteristic of a configuration state of the cabin equipment component connection system 22. In particular the control system 42 is capable of providing data, which in dependence upon the configuration state of the cabin equipment component connection system 22 that is dependent upon the configuration of the aircraft passenger cabin indicate whether or not the individual connecting elements 32 of the cabin equipment component connection system 22 are connected to a corresponding cabin equipment component. The control system 42 may be implemented in the form of hardware or software.

A reconfiguration of the aircraft passenger cabin 10 may further lead to a variation of the weight of the aircraft and/or a shift of the centre of gravity of the aircraft. A weight variation of the aircraft may arise for example as a result of the installation of additional cabin equipment components or the deinstallation of cabin equipment components in the event of a reconfiguration of the aircraft passenger cabin 10. Shifts of the centre of gravity already arise if the reconfiguration of the aircraft passenger cabin 10 is linked to a repositioning of cabin equipment components. The cabin equipment component connection system therefore comprises a further control system 44, which provides data regarding the weight of the cabin equipment component connection system 22 and of the cabin equipment components connected thereto and regarding the influence of the weight and the arrangement of the cabin equipment component connection system 22 and of the cabin equipment components connected thereto upon the centre of gravity of the aircraft. In FIG. 1 the further control system 44 is represented as a separate control system from the control system 42. The control systems 42, 44 may however alternatively be of a mutually integrated design and may be implemented both in the form of hardware or in the form of software.

The data provided by the control system 44 regarding the weight of the cabin equipment component connection system 22 and of the cabin equipment components connected thereto and/or regarding the influence of the weight and the arrangement of the cabin equipment component connection system 22 and of the cabin equipment components connected thereto upon the centre of gravity of the aircraft may be processed in different ways. In a first variant the control system 42 uses the data to update a database, which contains parameter data regarding the weight of the cabin equipment component connection system 22 and of the cabin equipment components connected thereto and/or regarding the influence of the weight and the arrangement of the cabin equipment component connection system 22 and of the cabin equipment components connected thereto upon the centre of gravity of the aircraft. The database then contains always actual, "real" data, which other monitoring- or control systems of the aircraft, for example a flight control system, may also access.

In addition or alternatively thereto the control system 44 of the cabin equipment component connection system 22 may use the data regarding the weight of the cabin equipment component connection system and of the cabin equipment components connected thereto also to determine a correction factor, which is capable of compensating a difference between a real weight of the cabin equipment component connection system and of the cabin equipment components connected thereto and a parameter value for the weight of the cabin equipment component connection system and of the cabin equipment components connected thereto that is stored in a database. In a similar fashion the control system 44 may use the data regarding the influence of the weight and the arrangement of the cabin equipment component connection system 22 and of the cabin equipment components connected thereto upon the centre of gravity of the aircraft to determine a correction factor, which is capable of compensating a difference between a real influence of the weight and the arrangement of the cabin equipment component connection system 22 and of the cabin equipment components connected thereto upon the centre of gravity of the aircraft and a parameter value for the influence of the weight and the arrangement of the cabin equipment component connection system 22 and of the cabin equipment components connected thereto upon the centre of gravity of the aircraft that is stored in a database. The corrected parameter values may then be used also by other monitoring- or control systems of the aircraft, for example a flight control system.

The invention claimed is:

1. Cabin equipment component connection system for an aircraft comprising:
   a plurality of connecting elements that connect a cabin equipment component to a higher-level system of the aircraft;
   a control system; and
   a plurality of connecting elements provided in at least one zone of the cabin equipment component connection system that is assigned to a predetermined region of
   a cabin of the aircraft;
   wherein, in a first configuration of the at least one zone:
   seats are provided for a predetermined first number of passengers or rows of seats that are arranged at a predetermined first distance from one another, and
   each of a plurality of cabin equipment components are provided in at least one of a first number and a first arrangement adapted to the first number of passengers or the first distance between rows; and
   wherein, in a second configuration of the at least one zone seats are provided for a predetermined second number of passengers or rows of seats that are arranged at a predetermined second distance from one another,
   wherein the second number of passengers is different from the first number of passengers or the second distance is different from the first distance, and
   each of a plurality of cabin equipment components are provided in at least one of a second number and a second arrangement adapted to the second number of passengers or the second distance between rows, wherein the at least one of the second number and the second arrangement are different from the at least one of the first number and the first arrangement,
   wherein, in each of the first and second configurations, each of the plurality of cabin equipment components can be connected to the plurality of connecting elements such that the zone can be changed between the first and second configurations without
   modification of a number and an arrangement of the connecting elements;
   wherein the control system provides:
   data indicating whether the zone is in the first or second configuration; and
   data indicating which of the plurality of connecting elements is configured to be connected to a cabin equipment component depending on whether the at least one zone is in the first or second configuration; and
   wherein the control system further provides at least one of:
   weight data indicating a weight of the cabin equipment component connection system and the cabin equipment components connected thereto; and
   influence data indicating an influence of the weight and the arrangement of the cabin equipment component connection system and the cabin equipment components connected thereto on a center of gravity of the aircraft.

2. The cabin equipment component connection system according to claim 1, wherein, in the at least one zone, one of the first and second configurations provides seats for predetermined maximum number of passengers or provides the rows of seats at a predetermined minimum distance from one another.

3. The cabin equipment component connection system according to claim 1, wherein, in the at least one zone, one of the first and second configurations provides seats for any predetermined number of passengers or provides rows of seats that are arranged at any predetermined distance from one another.

4. The cabin equipment component connection system according to claim 1, wherein the control system uses the at least one of the weight data and the influence data to update a database containing parameter data regarding at least one of the weight of the cabin equipment component connection system and the cabin equipment components connected thereto and the influence of the weight of the cabin equipment component connection system and of the cabin equipment components connected thereto on the center of gravity of the aircraft.

5. The cabin equipment component connection system according to claim 1, wherein the control system determines a correction factor by using at least one of:
   the weight data, wherein the correction factor is capable of compensating a difference between a real weight of the cabin equipment component connection system and of the cabin equipment components connected thereto and a parameter value stored in a database for the weight of the cabin equipment component connection system and of the cabin equipment components connected thereto; and
   the influence data, wherein the correction factor is capable of compensating a difference between a real influence of the weight and the arrangement of the cabin equipment component connection system and of the cabin equipment components connected thereto on the center of gravity of the aircraft and a parameter value stored in a database for the influence of the weight and arrangement of the cabin equipment component connection system and of the cabin equipment components connected thereto on the center of gravity of the aircraft.

6. The system of claim 1, further comprising a maintenance system that:
   receives data from the control system;
   identifies which of the plurality of connecting elements is configured to be connected to a cabin equipment component in the current configuration of the at least one zone, based on the data received from the control system, and
   checks a connection status of the connecting elements identified as being configured to be connected in the current configuration, wherein connecting elements that are not configured to be connected are exempted from checking.

7. A method of modifying a passenger cabin configuration in an aircraft, the method comprising the steps of:
   providing a cabin equipment component connection system for an aircraft according to claim 1;
   changing the at least one zone from the first configuration to the second configuration or from the second configuration to the first configuration; and providing, by a control system, data indicating whether the at least one zone is in the first or second configuration and indicating, by the control system, which of the plurality of connecting elements is configured to be connected to a cabin equipment component depending on whether the at least one zone is in the first or second configuration.

8. The method according to claim 7, further comprising providing, by the control system, at least one of:

weight data indicating a weight of the cabin equipment component connection system and of the cabin equipment components connected thereto; and influence data indicating an influence of the weight and the arrangement of the cabin equipment component connection system and of the cabin equipment components connected thereto on a center of gravity of the aircraft.

9. The method according to claim 8, further comprising using, by the control system, at least one of the weight data and the influence data to update a database that contains parameter data regarding at least one of:

the weight of the cabin equipment component connection system and of the cabin equipment components connected thereto, and the influence of the weight and of the arrangement of the cabin equipment component connection system and of the cabin equipment components connected thereto on the center of gravity of the aircraft.

10. The method according to claim 8, further comprising: using, by the control system, at least one of:

the weight data to determine:

a correction factor that compensates for a difference between a real weight of the cabin equipment component connection system and of the cabin equipment components connected thereto; and a parameter value stored in a database for the weight of the cabin equipment component connection system and of the cabin equipment components connected thereto; and the influence data to determine:

a correction factor that compensates for a difference between a real influence of the weight of the cabin equipment component connection system and of the cabin equipment components connected thereto on the center of gravity of the aircraft; and a parameter value stored in a database for the influence of the weight and the arrangement of the cabin equipment component connection system and of the cabin equipment components connected thereto on the center of gravity of the aircraft.

11. The method of claim 7, further comprising:

receiving, by a maintenance system, data from the control system;

identifying, by the maintenance system, which of the plurality of connecting elements is configured to be connected to a cabin equipment component in a current configuration of the at least one zone, based on the data received from the control system, and checking, by the maintenance system, a connection status of the connecting elements identified as being configured to be connected in the current configuration, wherein connecting elements that are not configured to be connected are exempted from checking.

* * * * *